(12) United States Patent
He et al.

(10) Patent No.: US 6,885,694 B1
(45) Date of Patent: Apr. 26, 2005

(54) CORRECTION OF RECEIVED SIGNAL AND INTERFERENCE ESTIMATES

(75) Inventors: Ning He, Sollentuna (SE); Thomas Östman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/516,158

(22) Filed: Feb. 29, 2000

(51) Int. Cl.$^7$ ................................ H04L 27/30
(52) U.S. Cl. ............... 375/144; 375/148; 375/346; 370/252; 455/52.3; 455/67.3; 455/226.3; 455/296
(58) Field of Search ................ 375/144, 148, 375/346, 285; 455/52.3, 67.1, 67.3, 226.1, 226.2, 226.3, 296; 570/252, 320, 332, 335, 342, 441, 479

(56) References Cited

U.S. PATENT DOCUMENTS

| | | | |
|---|---|---|---|
| 5,377,225 A | 12/1994 | Davis | |
| 5,386,472 A | 1/1995 | Pfaff et al. | |
| 5,450,453 A | 9/1995 | Frank | |
| 5,463,660 A | 10/1995 | Fukasawa et al. | |
| 5,596,570 A | 1/1997 | Soliman | |
| 5,644,592 A | 7/1997 | Divsalar et al. | |
| 5,675,581 A | 10/1997 | Soliman | |
| 5,710,974 A | 1/1998 | Granlund et al. | |
| 5,839,101 A | 11/1998 | Vähätalo et al. | |
| 5,862,453 A | 1/1999 | Love et al. | |
| 6,034,952 A * | 3/2000 | Dohi et al. | 370/335 |
| 6,229,842 B1 | 5/2001 | Schulist et al. | |
| 6,292,519 B1 | 9/2001 | Popovic | |
| 6,330,432 B1 * | 12/2001 | Tong et al. | 455/226.3 |
| 6,473,451 B1 * | 10/2002 | Seki et al. | 375/142 |

FOREIGN PATENT DOCUMENTS

| | | |
|---|---|---|
| EP | 0 776 105 | 5/1997 |
| EP | 0 856 955 | 8/1998 |

OTHER PUBLICATIONS

U.S. Appl. No. 09/038,067, filed Mar. 1998, Popovic.

* cited by examiner

Primary Examiner—Dac V. Ha
(74) Attorney, Agent, or Firm—Nixon & Vanderhye P.C.

(57) ABSTRACT

An apparatus and method are described in which a corrected signal-to-interference ratio (SIR) is determined in a cellular telephone receiver. First the estimated signal strength at the receiver is measured, then the estimated interference level is measured. The signal strength and the interference values are separately corrected in accordance with an algorithm. Thereafter, a corrected SIR value is obtained by dividing the corrected signal strength and the corrected interference values.

40 Claims, 9 Drawing Sheets

CORRECTION OF RECEIVED SIGNAL AND INTERFERENCE ESTIMATES

FIELD OF THE INVENTION

The present invention relates to telecommunications, and in particular, to accurate estimation and correction of signal levels and interference levels in a CDMA or other spread spectrum system.

BACKGROUND AND SUMMARY OF THE INVENTION

A spread spectrum system is a wideband system in which the entire frequency bandwidth of the system is available to each user all the time. The system expands or spreads the bandwidth of the transmitted information much more than the minimum bandwidth required to transmit the baseband data. The spreading of the data is performed using a spreading sequence, sometimes called a spreading code. Each user in the frequency bandwidth is distinguished from other users by the allocation of different spreading codes to each. Code Division Multiple Access (CDMA) systems are one kind of spread spectrum system.

Just as a CDMA transmitter spreads a signal across a bandwidth, a CDMA receiver compresses or de-spreads the received signal bandwidth in order to recover the original information. Since different users employ different spreading codes their respective transmissions can be separately decoded at a receiving station.

Spread spectrum systems have a number of advantages. First, CDMA receivers can diversity combine separate multi-paths using a RAKE receiver. A RAKE receiver enhances the capture of the received signal energy by allocating one of a number of parallel demodulators (referred to as "fingers") to each of the strongest components of the received multipath signal. The outputs of all the RAKE fingers are combined (taking the best from each finger) after a corresponding delay compensation to construct an optimum received signal.

Second, CDMA systems tolerate interference up to a certain threshold limit. The introduction of additional active mobile radio transmissions to the CDMA system increases the overall level of interference at the cell site receivers (base stations) receiving CDMA signals from the mobile radio transmitters. Since all users employ the same frequency bandwidth, it is important that no one user dominates the bandwidth with high relative power transmission. The particular level of interference introduced by each mobile's transmission depends on its received power level at the cell site, its timing synchronization relative to other sites at the cell site, and its specific cross-correlation with other transmitted CDMA signals. For that reason, power control is very important in CDMA systems. Typically, power control attempts to achieve a constant mean power level for each mobile user received at a base station taking into account the transmission power at the mobile and the pathloss from the mobile to the base station.

The CDMA base stations control mobile transmit power of each mobile user based on Signal-to-Interference Ratio (SIR) measurements of mobile transmission received at the base station. The SIR is defined as the ratio of the data bit energy ($E_b$) to the interference (including noise) power spectral density ($I_o$).

SIR measurements are compared with a reference $E_b/I_o$ value, and depending on the result, the mobile is ordered to increase or decrease its transmit power by some predetermined amount, (e.g., 1 dB). Other kinds of SIR measurements can be used to adjust the reference $E_b/I_o$ level in order to achieve a specified frame error rate at the base station.

Thus, to ensure that no mobile station dominates the bandwidth by using excessive power levels, the system measures or determines $E_b$ and $I_o$ values for each mobile. Based on those measurements, the system instructs the mobiles to adjust their power levels to appropriate, non-dominating values.

An estimation of data bit energy $E_b$ can be performed after de-spreading and RAKE combining in the receiver. Depending on the SIR measurement application, it may be performed using a short or a long averaging period. A short averaging period is used when the $E_b$ value is measured using only pilot preamble symbols transmitted at the beginning of each time slot within a data frame. For long-term SIR measurements, $E_b$ values obtained for the pilot preamble and for each individual data symbol are averaged over the time slot period, and $E_b$ values obtained from all slots are averaged at the end of the frame to produce the final long term $E_b$ measurement value.

In both short and long term SIR measurement, the interference power $I_o$ may be averaged over a number of frames. More specifically, $I_o$ may be obtained by correlating the input signal multiple times with an uncorrelated (in the ideal case, orthogonal) spreading code or with time-shifted versions of the original spreading code used at the transmitter and averaging the multiple, squared, absolute correlation values over the number of frames.

Figure 1:
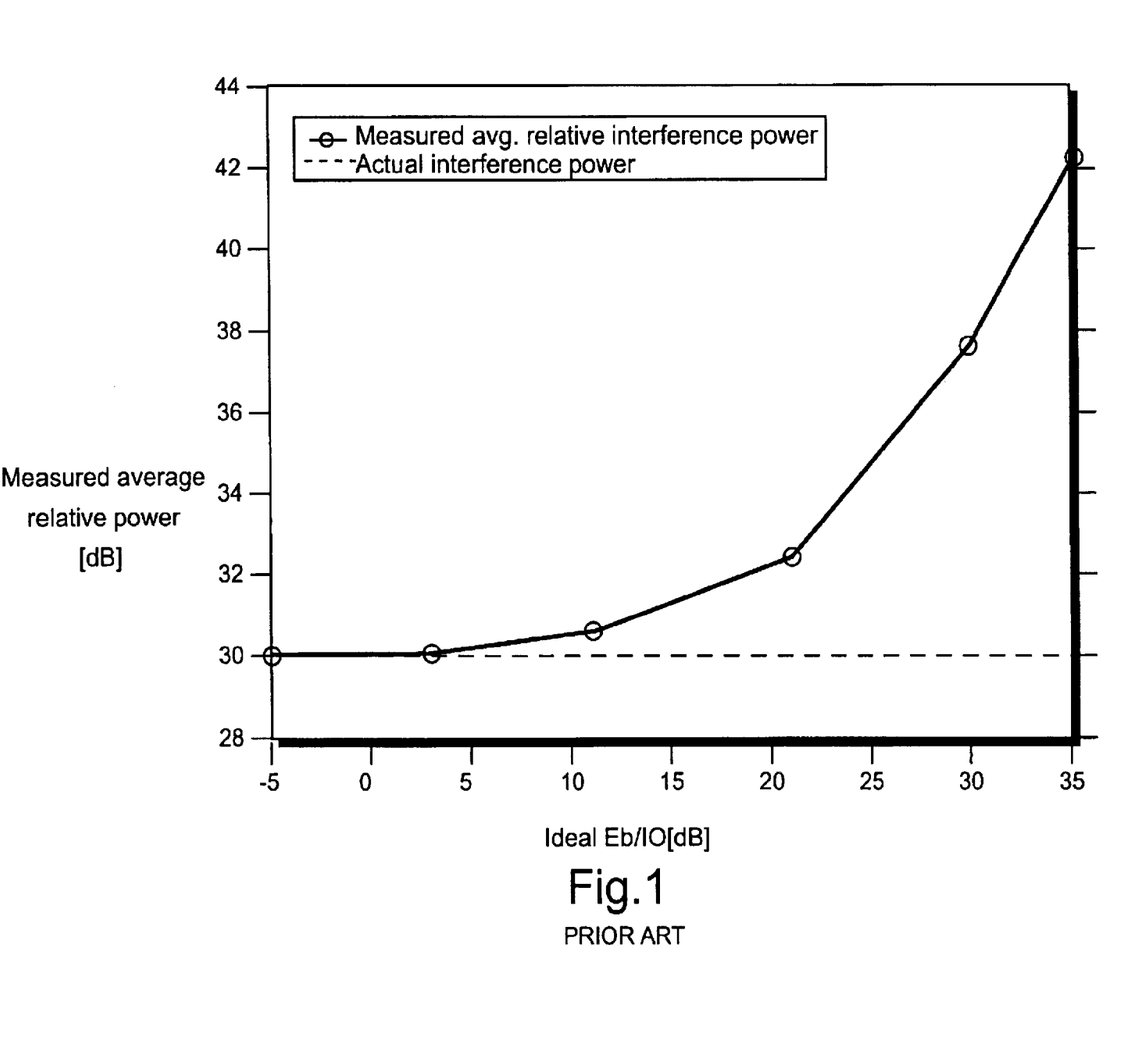
FIG. 1 is a graph of a prior art comparison between measured interference levels versus actual interference levels.

The accuracy of the received signal level, interference level and received signal energy measurements and estimations are very important in the CDMA system to ensure good signal quality and maximum system capacity. Commonly-assigned U.S. Pat. No. 6,229,842, "Adaptive Path Selection Threshold Setting for DS-CDMA Receivers," by Schulist et al is a prior method of interference level measurements. It, however, exhibits larger errors as increases, as shown in the graph of FIG. 1. As shown in FIG. 1, as increases, measurement error of the received interference level is dramatic. It is likely caused mainly by non-zero auto-correlation of the spread sequence, namely pn (K)·pn (K+t)$^1$0 when t$^1$0 where pn (K) is the spreading code for sample index K and pn (K+t) is the spreading code for an incremented (non-zero) sample index. The mean error shown in FIG. 1 depends on the received signal level and increases as increases.

Figure 2:
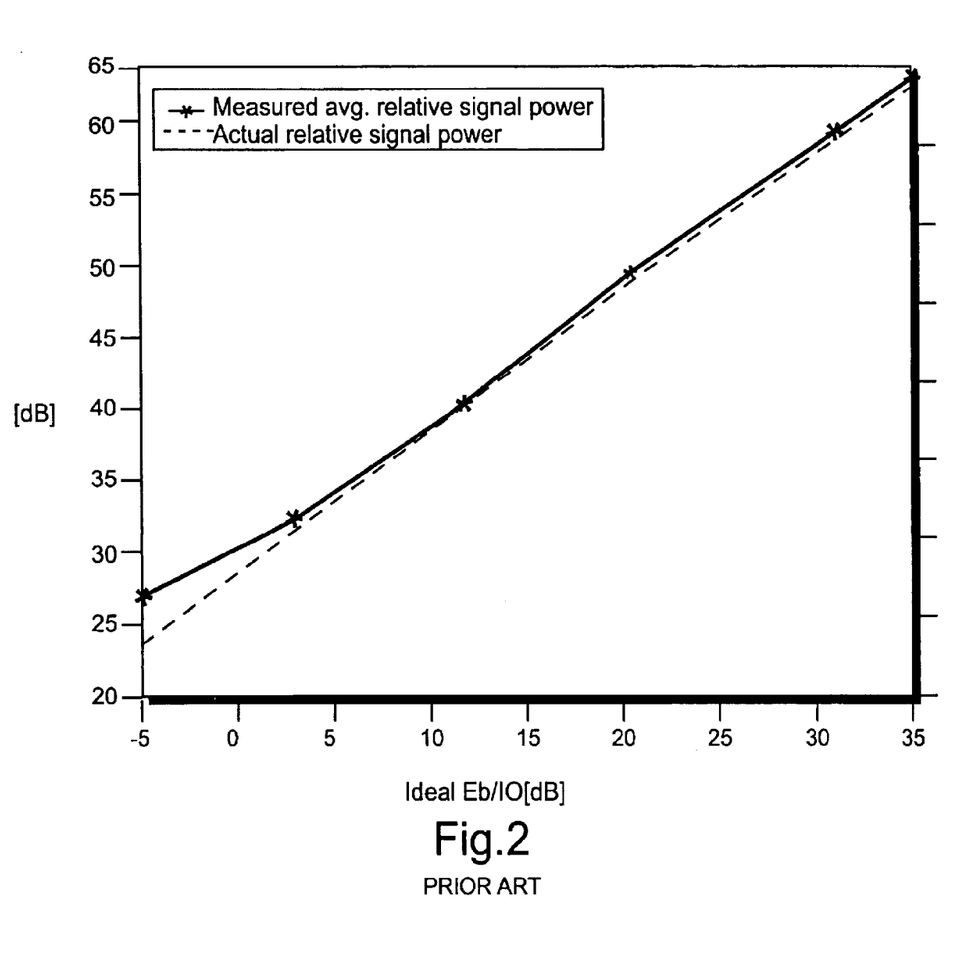
FIG. 2 is a graph of a prior art relationship between measured average relative signal power and actual relative signal power.

An Ericsson-internal document "Base Station Demodulator," by Ning He, illustrates and describes the specific structure of a demodulator that may form the basis for SIR measurement, estimation and correction in the present CDMA system. "Base Station Demodulator" also describes, beginning for example at page 23 and continuing, power and interference estimations and corrections. The measurement of received signal level provided by the methods described in that publication saturates at low values, as shown in FIG. 2. FIG. 2 illustrates that the relation between actual and estimated SIR is approximately linear for input values above about 10 dB; however, below 10 dB, the SIR measurement values saturate.

Saturation of SIR values is problematic in that the measured SIR value will be used by the base station to instruct the mobile to adjust its transmission power levels. Where the measurements linearly track the ideal SIR, the instructions from the base station will accurately reflect proper adjustments for the true input signal strength. But, at levels where the curve is saturated, the base station may provide power level adjustment instructions that bear little relation to the true input signal levels. At worst, the saturation can cause an unstable power control loop for certain input signal levels.

In the case of FIG. 2, the measurement error of the received signal level is caused mainly by the noise/interference component in the measurement. The mean error depends on the interference level and increases as $E_b/I_o$ decreases.

Figure 3:
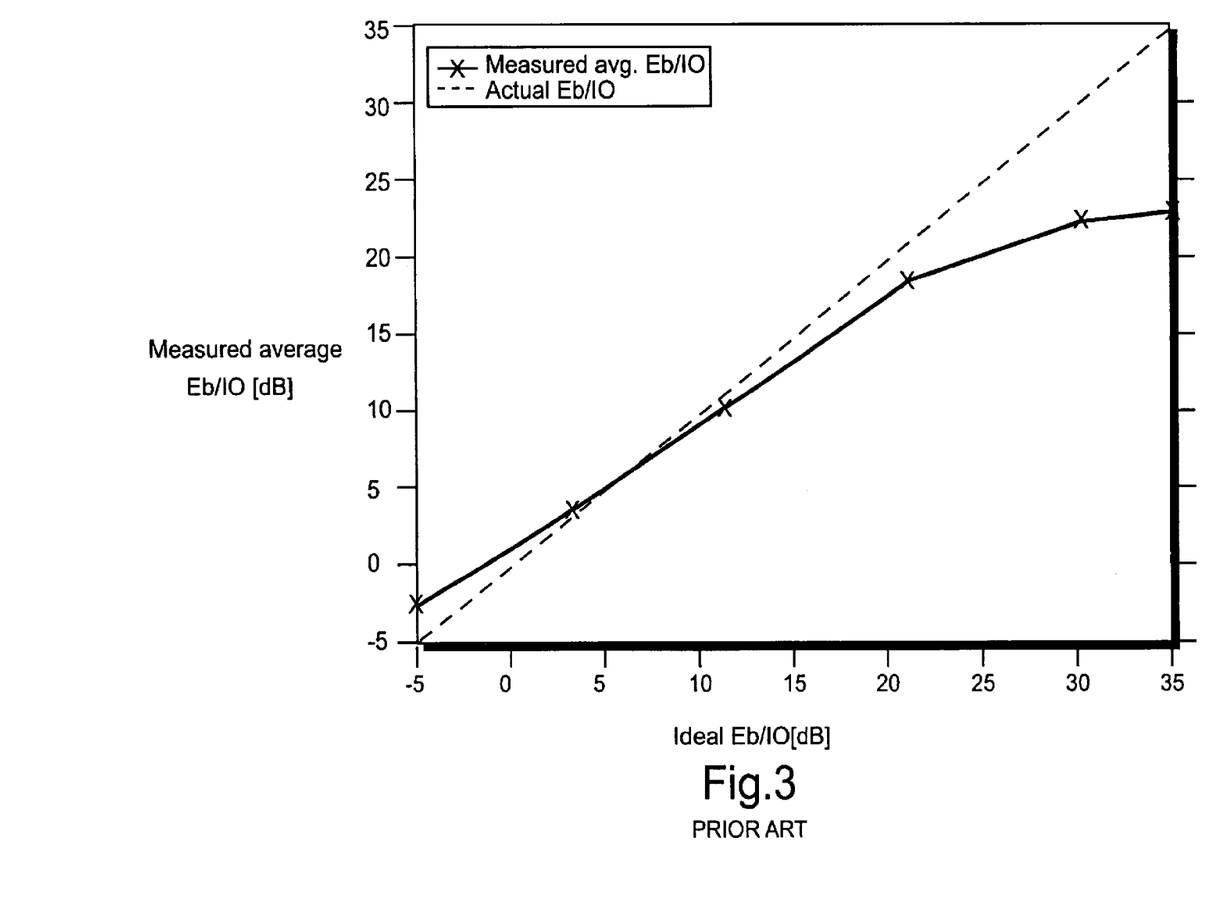
FIG. 3 is a graph representing a combination of the signal strength measurements of FIG. 2 with the interference measurements of FIG. 1 into a measured SIR value versus actual SIR value representation.

A combination of the signal measurements (FIG. 1 and interference measurements (FIG. 2) yields an SIR with saturation problems at both the upper and lower input values, as shown in FIG. 3. There, linearization between actual and measured SIR values is poor across most of the curve, but especially so below about 5 dB and above about 20 dB.

U.S. patent application Ser. No. 09/038,067 (filed Mar. 11, 1998), describes a piece-wise linearization method for correcting SIR measurements. Its method is quite sensitive in the saturation regions. In an example embodiment of that disclosure, an SIR correction function includes a linear part and a non-linear part, with the non-linear part corresponding to an inverse of an exponential function that approximates a non-linear portion of a curve corresponding to measured SIR values. In a second example embodiment, the linear part of the SIR correction function further includes first and second linear components to improve the accuracy of the correction function in certain situations. The parameters in the correction function in both of the first and second example embodiments are selected to minimize error between corrected SIR values and corresponding actual or ideal SIR values.

The present invention provides an alternative method of correcting SIR values in which the signal strength value and interference value are corrected separately. Since the errors associated with signal strength measurements and those associated with interference estimates derive from different sources, independent correction is found to provide improved overall SIR correction. Thus, unlike "Base Station Demodulation" where SIR per se is corrected (see for example equation 34 therein) and "Correction of signal-to-interference ratio measurements" by Popovic, where SIR per se is also corrected (see for example equations 3 and 4 and associated text), the present invention corrects the SIR by first correcting signal and interference values independently and then combining the corrected signal and corrected interference into a corrected SIR.

BRIEF DESCRIPTION OF THE DRAWINGS

These and other objects, features, and advantages of the present invention will now be described in conjunction with the drawings in which.

DETAILED DESCRIPTION OF THE PRESENTLY PREFERRED EMBODIMENT

Figure 7:
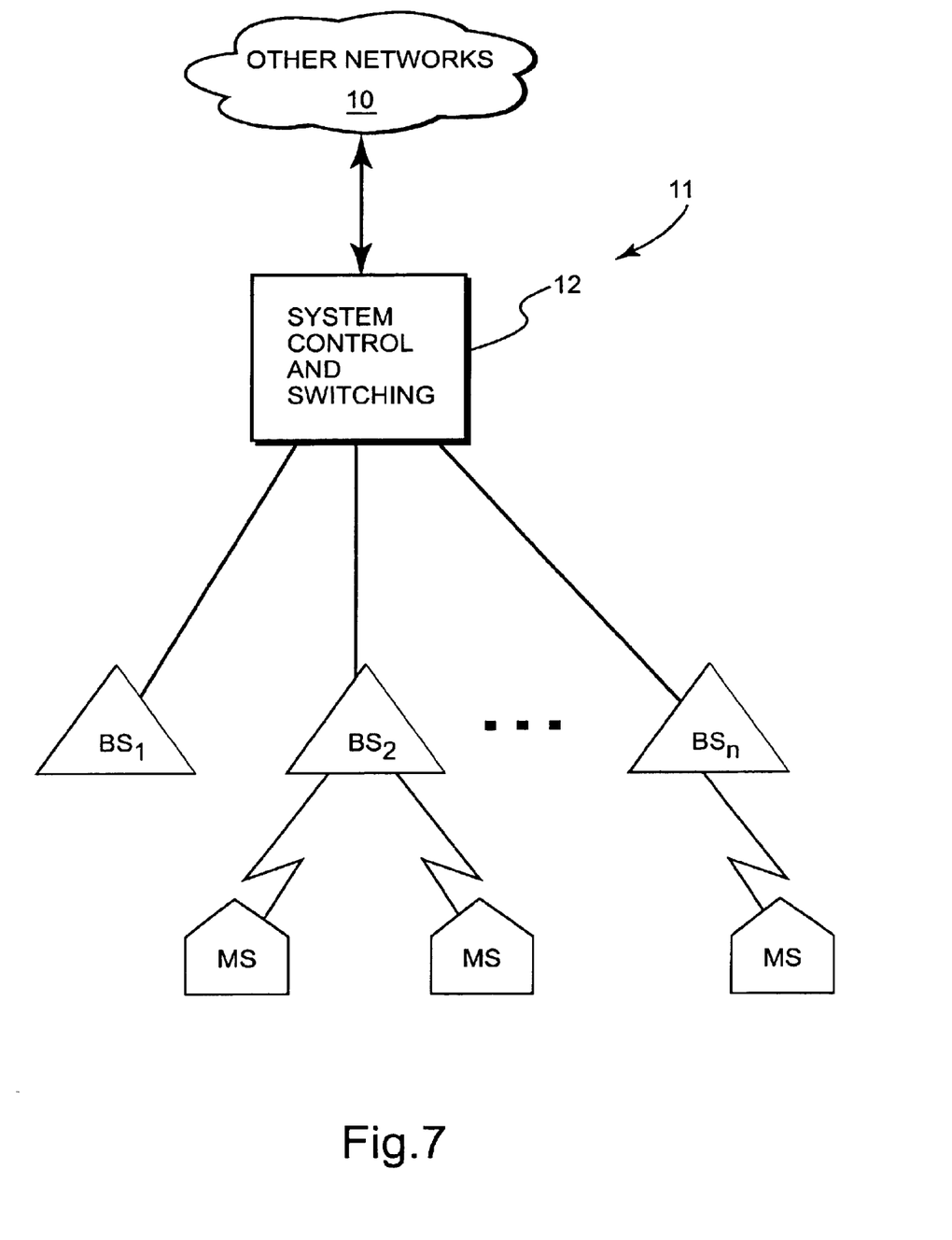
FIG. 7 is a CDMA cellular phone system into which the present invention may be incorporated.

FIG. 7 illustrates an example CDMA cellular radio telephone system in which the present invention may be employed. In general, the CDMA system 11 employs spread spectrum techniques to modulate and de-modulate communications between the mobile stations MS and base stations $BS_1$, $BS_2$, ... $BS_n$. The system control and switch 12 controls the communications between the base station $BS_1$, $BS_2$ ... $BS_9$ to other networks 10 including, for example, public switch telephone networks, the Internet, etc. The system control and switch 12 also facilitates communications between the base stations $BS_1$, $BS_2$, ... $BS_n$.

As is well known, each base station $BS_1$, $BS_2$, ... $BS_n$ generally services an assigned geographical cell area. As the mobile stations MS move in and out of the various cells, they will establish communications with the associated base stations for communication with the other networks 10 and other mobile stations MS. When a mobile station enters the geographical area assigned to a particular base station, for example, base station $BS_2$ in FIG. 7, the mobile station establishes communication with the base station $BS_2$. As described previously, one function of the base station $BS_2$ and system 12 in facilitating communications within a particular cell is to ensure that transmission power levels at the base station $BS_2$ are relatively uniform among the various mobile stations communicating within the cell. For this purpose, the base station $BS_2$ takes frequent measurements of received signal strength for each mobile station in its geographic area and provides the associated mobile stations with the power control information. The power control information instructs the mobile station to increase or decrease power levels in order to relatively unify the power level of any particular mobile station with those of the other mobile stations in the cell vis-a-vis the received signal strength at the base station $BS_2$. The way in which the received signal strength and measured interference are obtained by the base station $BS_2$ is not particularly critical to the present invention. An example method of how these signal and interference values may be measured in the first instance is described, for example, in "Base Station Demodulator: Releases R2 & R3 & R4" by Ning He.

Figure 8:
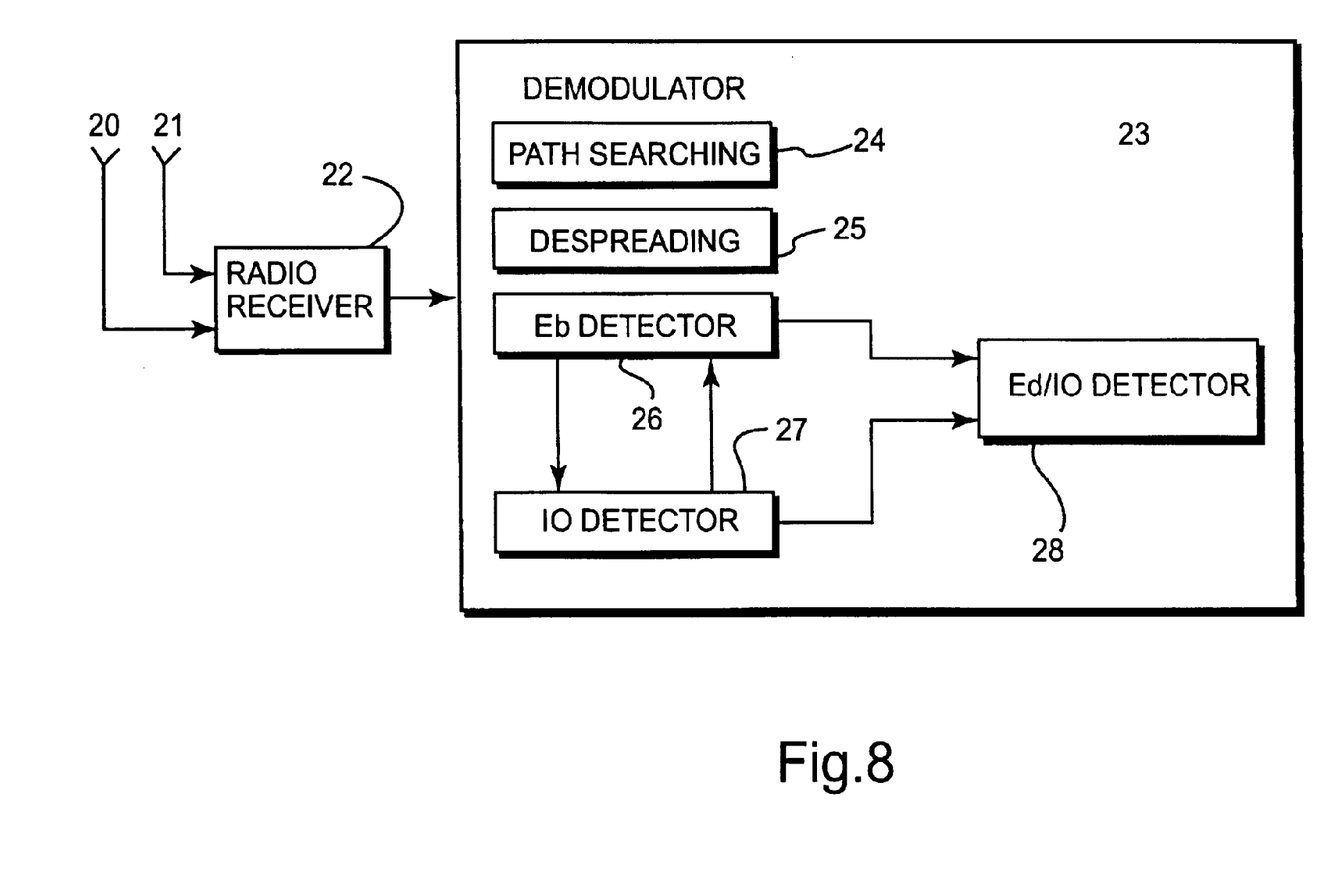
FIG. 8 is a demodulator of a base station into which the present invention may be incorporated.

As shown in FIG. 8, a de-modulator 23 of, for example, a base station BS2, will receive signals from a mobile station via antennas 20–21 and radio receiver 22. In the preferred embodiment, the receiver will take the form of a well-known RAKE receiver in which a signal from a mobile station is collected from a number of RAKE receiver fingers and combined in the RAKE receiver. Thus, in the RAKE finger receivers, signal energy from the multiple paths are detected by a searcher unit 24 and are collected in order to exploit the multi-path characteristics of the transmission channels. The de-modulator 23 also includes a de-spreading function which transforms the desired receive signal from the wide band representation associated with spread spectrum to narrow band representation suitable for signal information retrieval.

The signal detector 26 of the de-modulator 23 at the base station BS measure the received power level by compiling and processing the relative logical channel power levels delivered from the fingers of the RAKE receiver in each slot. The interference detector 27 may obtain $I_o$ by correlating the input signal a multiple number of times with an un-correlated (in the preferred case, orthogonal) spreading code and averaging the multiple, squared, absolute correlation values over the number of frames. Alternatively, $I_o$ may be obtained by correlating the input signal multiple times with time-shifted versions of the original spreading code used at the transmitter and, again, averaging the multiple, squared, absolute correlation values over the number of frames.

At block 28 of the de-modulator 23, the measured $E_b$ values from $E_b$ detector 26 and the measured $I_o$ values from $I_o$ detector 27 are combined into the $E_b/I_o$ (SIR) value. The SIR values in the respective detectors are corrected in accordance with further aspects of the present invention described below, with respect to FIG. 9. There, the SIR correction function begins at step 30. At step 31, $K_i$ and $K_s$ constants are determined and depend on the spreading code employed. The values $K_i$ and $K_s$ can be carried out by, for example, simulation in order to determine their constant values. That is, the values $K_i$ and $K_s$ depend upon the measured SIR curve, the shape of which is the function of the spreading factor and the number of values used for non-coherent averaging. The parameters $K_i$ and $K_s$ are determined to minimize the maximum absolute error between the ideal and corrected SIR curves and can be determined using manual tests and observation or using available numerical optimization algorithms.

Figure 9:
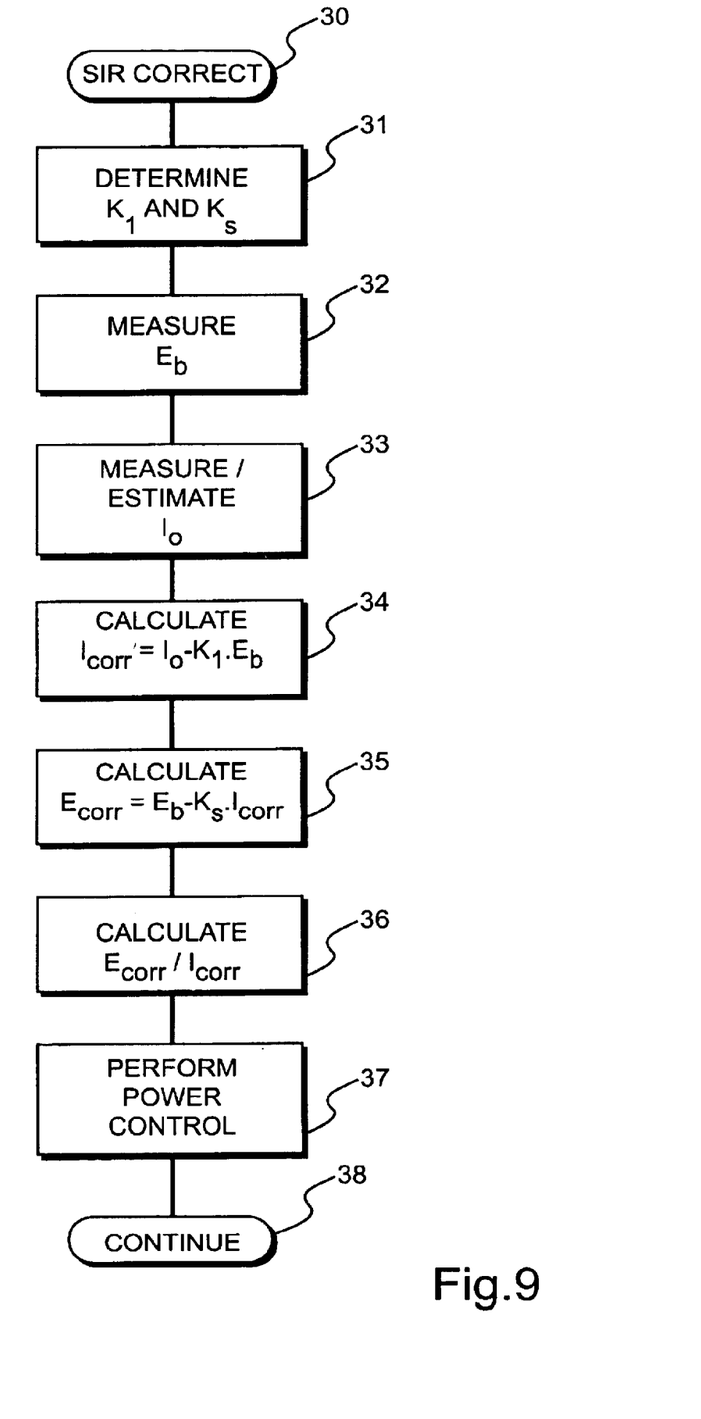
FIG. 9 is a flowchart illustrating an example embodiment of the present invention.

At step 32, the receive signal strength $E_b$ is measured at the $E_b$ detector 26. At step 23, the interference level $I_o$ is measured or estimated at the $I_o$ detector 27.

Figure 4:
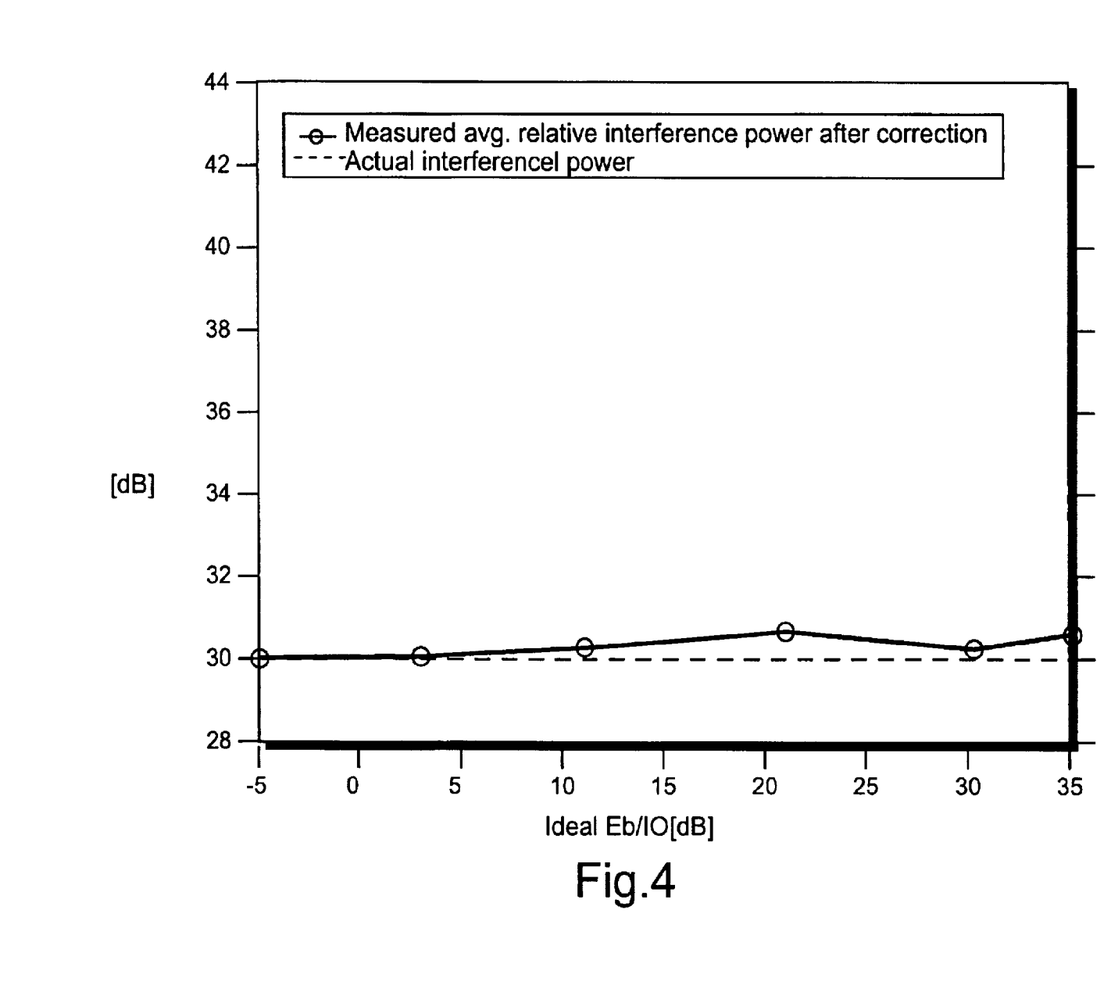
FIG. 4 is a graph of measured interference versus actual interference in accordance with the present invention.

At step 34, the interference value $I_o$ is corrected by the factor $K_i \cdot E_b$ in accordance with the equation:

$$I_{corr} = I_o - K_i \cdot E_b,$$

where $E_b$ is the received signal level, $I_o$ is the measured interference level, and $K_i$ is a constant depending only on the spreading code and determined by simulation. FIG. 4 illustrates a graph of the measured relative interference power $I_{corr}$ after correction versus the actual interference power. One can see from FIG. 4 that the corrected interference power closely tracks the actual interference power along a wide range of input signal values.

Figure 5:
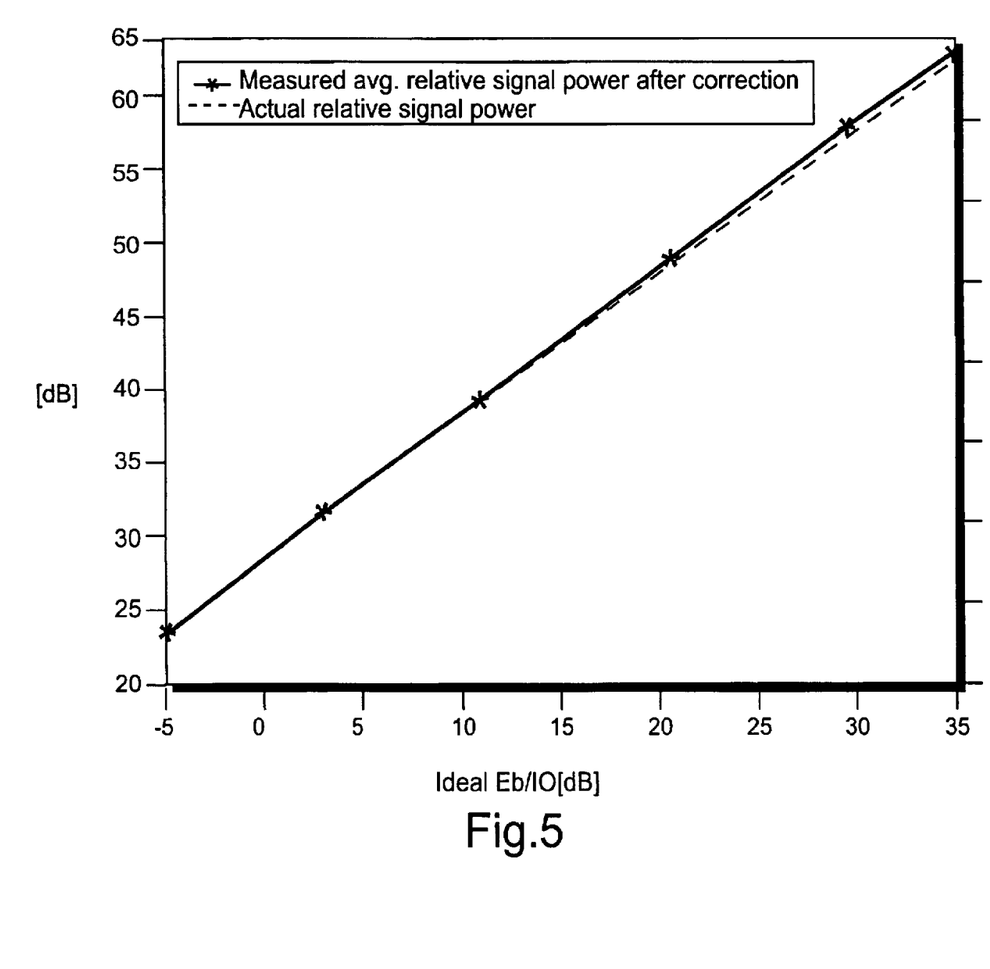
FIG. 5 is a graph of a relationship between measured signal power and actual signal power in accordance with the present invention.

In a similar manner, the received signal strength $E_b$ is corrected at step 35 of FIG. 9 in accordance with the equation:

$$E_{corr} = E_b - K_s \cdot I_{corr},$$

where $I_{corr}$ is the corrected interference level from the above equation, $K_s$ is a constant depending only on the spreading code and determined by simulation, and $E_b$ is the measured signal strength at the base station. FIG. 5 is a graph of the measured relative signal power $E_{corr}$ after correction at step 35 versus the actual relative signal power. One can see that the corrected signal strength closely tracks the actual received signal power along a wide range of input signal strengths.

Figure 6:
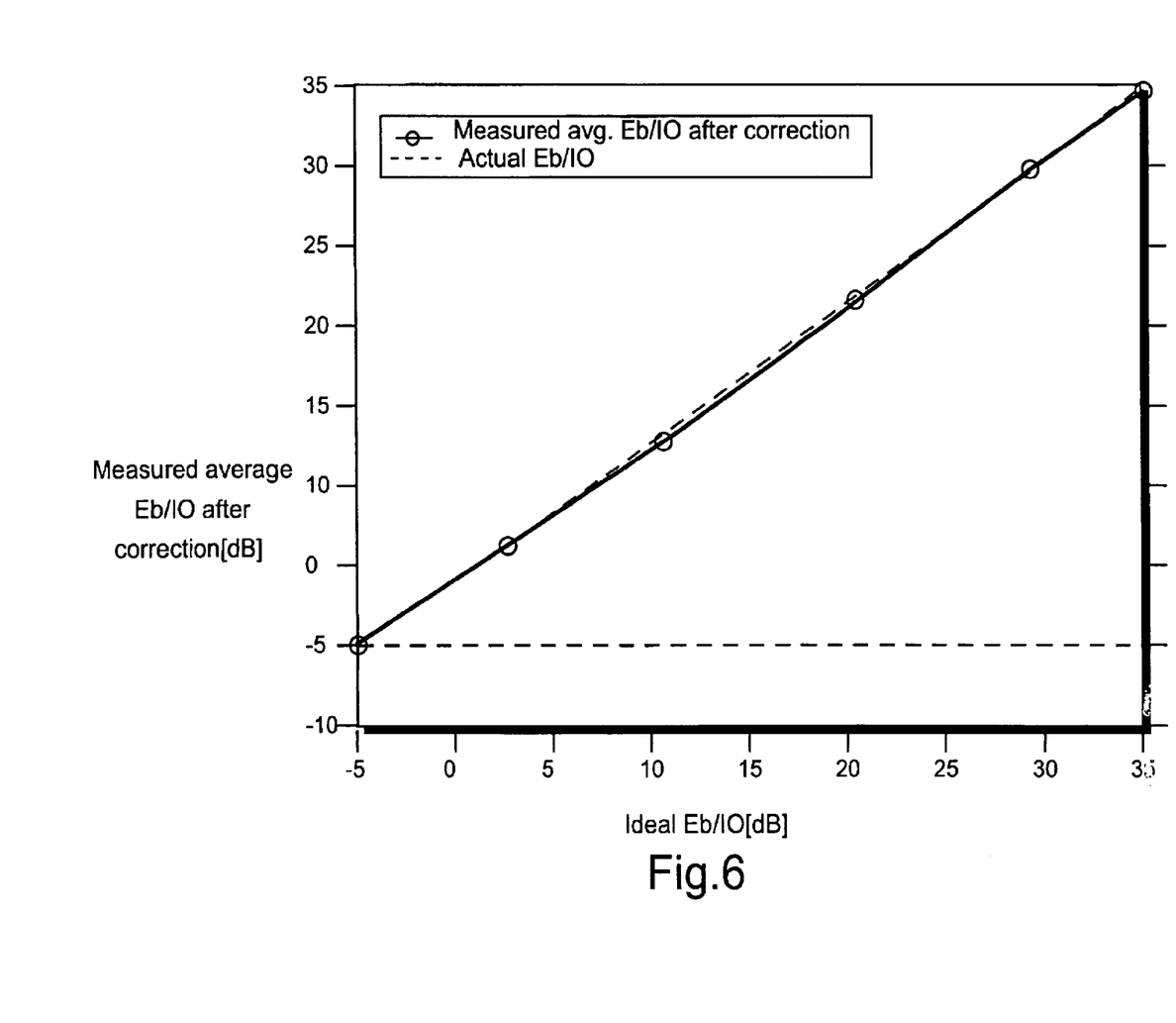
FIG. 6 is a graph illustrating a combination of the signal graph of FIG. 5 and the interference graph of FIG. 4 into a relationship of measured SIR versus actual SIR in accordance with the present invention.

At step 36, the SIR value $E_{corr}/I_{corr}$ is calculated using the values obtained at steps 34 and 35. That is, instead of a measured SIR value being corrected per se, the signal value per se and the interference value per se are corrected in accordance with steps 34 and 35 and the SIR value is then, thereafter, obtained at step 36. FIG. 6 is a graph of the SIR value obtained at step 36 after correction versus the actual SIR value. As one can see from FIG. 6, the corrected SIR value closely mirrors the actual SIR value along a wide range of input signal values.

In comparison to FIG. 3, where the measured SIR value deviates significantly from the actual SIR value, and provides substantial saturation portions in the high and low SIR regions, FIG. 6 shows marked improvements in the linear tracking of the corrected SIR value versus the actual SIR value. In particular, as shown in FIG. 6, the saturation regions at the upper and lower ends of the curve of FIG. 3 have been essentially removed. Thus, more precise and reliable power control can be provided in accordance with the present invention than can be provided by the embodiment of FIG. 3.

Even compared to the SIR correction measurements of U.S. patent application Ser. No. 09/038,067, where the SIR value is corrected as a whole rather than as its respective components, one can see good improvement in the linearity of the after correction SIR values. This is shown, for example, by comparing FIG. 6 of the present invention (where the corrected SIR value closely tracks and smoothly tracks the actual SIR value) to the similar curve in FIG. 6 of U.S. application Ser. No. 09/038,067 (where saturation regions have been well-compensated but some non-smooth irregularity remains).

It is thus apparent that, since signal power and interference measurements have associated errors caused by different sources, it is advantageous to correct them independently of each other prior to combination into a corrected SIR value, rather than calculating the SIR value and thereafter providing correction techniques.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method comprising:

receiving a signal transmitted over a communications channel;

measuring an estimate of an energy value and an interference value of the received signal;

correcting the energy value of the received signal for non-linearity;

correcting the interference value of the received signal for non-linearity; and determining a corrected signal-to-interference ratio (SIR) value using the corrected energy value and the corrected interference value.

2. The method in claim 1, wherein:

the interference value is corrected in accordance with the following equation: $I_{corr} = I_o - K_i \cdot E_b,$ where $I_{corr}$ is the corrected interference value, $E_b$ is the measured estimate energy value, $I_o$ is the measured estimate interference value, and $K_i$ is a constant.

3. The method in claim 2, wherein $K_i$ is a constant depending on a spreading code associated with the transmitted signal.

4. The method in claim 3, wherein $K_i$ is selected by simulation to minimize error between the corrected interference value and a corresponding actual interference value.

5. The method in claim 2, wherein:
the energy value is corrected in accordance with the following equation: $E_{corr}=E_b-K_s \cdot I_{corr}$, where $K_s$ is a constant.

6. The method in claim 5, wherein $K_s$ is a constant depending on a spreading code associated with the transmitted signal.

7. The method in claim 6, wherein $K_s$ is selected by simulation to minimize error between the corrected energy value and a corresponding actual energy value.

8. The method in claim 1, wherein:
the interference value is corrected in accordance with the following equation: $I_{corr}=I_o-K_i \cdot E_b$, and the energy value is corrected in accordance with the following equation:

$$E_{corr}=E_b-K_s \cdot I_{corr},$$

where $E_b$ is the measured estimate energy value, $I_o$ is the measured estimate interference value, $K_i$ is a constant, $K_s$ is a constant, where $K_i$ and $K_s$ depend on a spreading code associated with the transmitted signal and are selected by simulation to minimize error between the corresponding corrected interference and energy values and corresponding ones of the actual interference and energy values.

9. The method in claim 8, wherein the method is used in a spread spectrum radio communications system and the constants $K_i$ and $K_s$ are determined as a function a spreading factor used to spread information to be transmitted over an available frequency spectrum.

10. For use in a communications system, including plural mobile stations and
at least one base station, a radio station comprising:
a signal detector for estimating received signal strength associated with a communication between one of the mobile stations and the base station, and
an interference detector for estimating an interference value associated with the communication,
wherein the radio station is configured to independently compensate the estimated signal strength and the estimated interference value, and thereafter, determine a corrected signal-to-interference ratio (SIR) estimate based on the compensated signal strength and interference value estimates,
the radio station is configured to compensate the estimated interference value in accordance with the following equation: $I_{corr}=I_o-K_i \cdot E_b$,
where $I_{corr}$ is the compensated interference value, $E_b$ is the estimated received signal strength, $I_o$ is the estimated interference value, and $K_i$ is a constant.

11. The radio station in claim 10, wherein the estimated received signal strength and estimated interference value establish an estimated SIR, and the base station is configured to determine the corrected SIR estimate to minimize a difference between the estimated SIR and an actual SIR corresponding to the estimated SIR.

12. The radio station of claim 11 in a spread spectrum radio communications system.

13. The radio station of claim 11, wherein the radio station is a base station.

14. The radio station of claim 11, wherein the radio station is a mobile station.

15. The radio station in claim 10, wherein the radio station is configured to generate a power control command based on the corrected SIR estimate and transmit that power control command.

16. The radio station in claim 10, wherein $K_i$ is a constant depending on a spreading code associated with the transmitted signal.

17. The radio station in claim 16, wherein $K_i$ is selected by simulation to minimize error between the corrected interference value and a corresponding actual interference value.

18. The radio station in claim 10, wherein: the radio station is configured to compensate the estimated received signal strength in accordance with the following equation: $E_{corr}=E_b-K_s \cdot I_{corr}$
where $E_{corr}$ is the corrected received signal strength, and $K_s$ is a constant.

19. The signal strength in claim 18, wherein $K_s$ is a constant depending on a spreading code associated with the transmitted signal.

20. The radio station in claim 19, wherein $K_s$ is selected by simulation to minimize error between the corrected signal strength and a corresponding actual signal strength.

21. The radio station in claim 10 in a spread spectrum radio communications system, wherein the constants $K_i$ and $K_s$ are determined as a function of a spreading factor used to spread information to be transmitted over an available frequency spectrum, and wherein $K_s$ is a constant.

22. For use in a communications system, including plural mobile stations and
at least one base station, a radio station comprising:
a signal detector for estimating received signal strength associated with a communication between one of the mobile stations and the base station, and
an interference detector for estimating an interference value associated with the communication,
wherein the radio station is configured to independently compensate the estimated signal strength and the estimated interference value, and thereafter, determine a corrected signal-to-interference ratio (SIR) estimate based on the compensated signal strength and interference value estimates, and
wherein the radio station is configured to compensate the estimated received signal strength for a non-linearity and to compensate the estimated interference value for a non-linearity.

23. Apparatus comprising:
a receiver for receiving a signal transmitted over a communications channel;
a first detector for determining an estimate of an energy value of the received signal;
a second detector for determining an interference value of the received signal; and
circuitry configured to correct the energy value of the received signal for non-linearity, correct the interference value of the received signal for non-linearity, and determine a corrected signal-to-interference ratio (SIR) value using the corrected energy value and the corrected interference value.

24. The apparatus in claim 23, wherein:
the interference value is corrected in accordance with the following equation:

$$I_{corr}=I_o-K_i \cdot E_b,$$

where $I_{corr}$ is the corrected interference value, $E_b$ is the measured estimate energy value, $I_o$ is the measured estimate interference value, and $K_i$ is a constant.

25. The apparatus in claim 24, wherein $K_i$ is a constant depending on a spreading code associated with the transmitted signal.

26. The apparatus in claim 25, wherein $K_i$ is selected by simulation to minimize error between the corrected interference value and a corresponding actual interference value.

27. The apparatus in claim 24, wherein:

the energy value is corrected in accordance with the following equation:

$$E_{corr} = E_b - K_s \cdot I_{corr},$$

where $K_s$ is a constant.

28. The apparatus in claim 27, wherein $K_s$ is a constant depending on a spreading code associated with the transmitted signal.

29. The apparatus in claim 28, wherein $K_s$ is selected by simulation to minimize error between the corrected energy value and a corresponding actual energy value.

30. The apparatus in claim 23, wherein the circuitry is configured to correct the interference value in accordance with the following equation: $I_{corr} = I_o - K_i \cdot E_b$ and the energy value is corrected in accordance with the following equation:

$$E_{corr} = E_b - K_s \cdot I_{corr},$$

where $E_b$ is the measured estimate energy value, $I_o$ is the measured estimate interference value, $K_i$ is a constant, $K_s$ is a constant, where $K_i$ and $K_s$ depend on a spreading code associated with the transmitted signal and are selected by simulation to minimize error between the corresponding corrected interference and energy values and corresponding ones of the actual interference and energy values.

31. The apparatus in claim 30, wherein the apparatus is used in a spread spectrum radio communications system and the constants $K_i$ and $K_s$ are determined as a function a spreading factor used to spread information to be transmitted over an available frequency spectrum.

32. Apparatus comprising:

means for receiving a signal transmitted over a communications channel;

means for determining an estimate of an energy value of the received signal;

means for determining an interference value of the received signal; and means for correcting the energy value of the received signal for non-linearity;

means for correcting the interference value of the received signal for non-linearity; and means for determining a corrected signal-to-interference ratio (SIR) value using the corrected energy value and the corrected interference value.

33. The apparatus in claim 32, wherein the means for correcting the interference value includes means for correcting the interference value in accordance with the following equation: $I_{corr} = I_o - K_i \cdot E_b$, where $I_{corr}$ is the corrected interference value, $E_b$ is the measured estimate energy value, $I_o$ is the measured estimate interference value, and $K_i$ is a constant.

34. The apparatus in claim 33, wherein $K_i$ is a constant depending on a spreading code associated with the transmitted signal.

35. The apparatus in claim 34, wherein $K_i$ is selected by simulation to minimize error between the corrected interference value and a corresponding actual interference value.

36. The apparatus in claim 33, wherein the means for correcting the energy value includes means for correcting the energy value in accordance with the following equation: $E_{corr} = E_b - K_s \cdot I_{corr}$, where $K_s$ is a constant.

37. The apparatus in claim 36, wherein $K_s$ is a constant depending on a spreading code associated with the transmitted signal.

38. The apparatus in claim 37, wherein $K_s$ is selected by simulation to minimize error between the corrected energy value and a corresponding actual energy value.

39. The apparatus in claim 32, wherein the means for correcting the interference value includes means for correcting the interference value in accordance with the following equation: $I_{corr} = I_o - K_i \cdot E_b$, and the means for correcting the energy value includes means for correcting the energy value in accordance with the following equation: $E_{corr} = E_b - K_s \cdot I_{corr}$, where $E_b$ is the measured estimate energy value, $I_o$ is the measured estimate interference value, $K_i$ is a constant, $K_s$ is a constant, where $K_i$ and $K_s$ depend on a spreading code associated with the transmitted signal and are selected by simulation to minimize error between the corresponding corrected interference and energy values and corresponding ones of the actual interference and energy values.

40. The apparatus in claim 39, wherein the apparatus is used in a spread spectrum radio communications system and the constants $K_i$ and $K_s$ are determined as a function a spreading factor used to spread information to be transmitted over an available frequency spectrum.

* * * * *